May 2, 1950 R. E. McKELVEY 2,506,514
REDUCTION DRIVE FOR DRILL PRESSES AND THE LIKE
Filed March 8, 1946
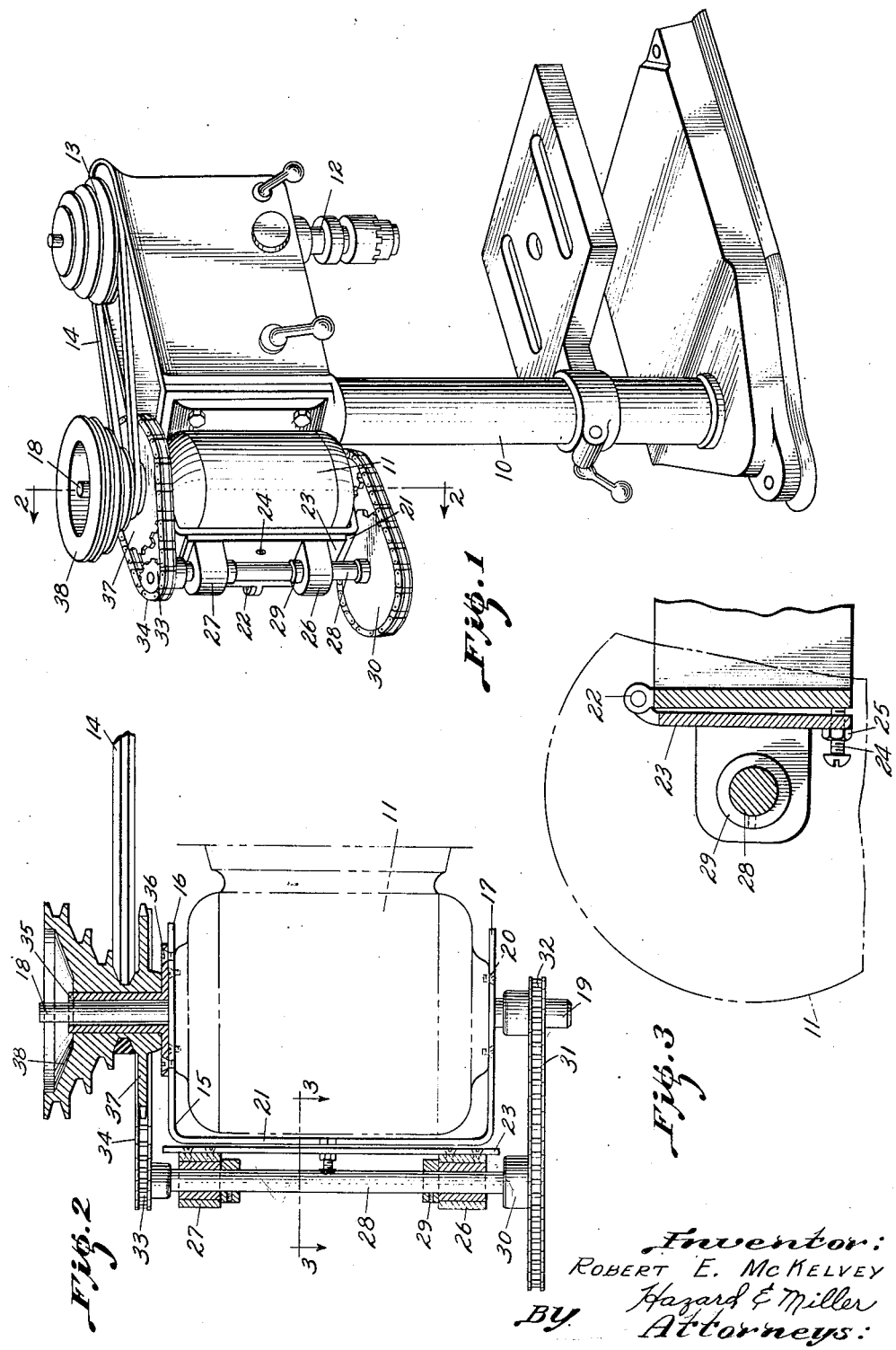
Inventor:
ROBERT E. MCKELVEY
BY Hazard & Miller
Attorneys Patented May 2, 1950

2,506,514

UNITED STATES PATENT OFFICE 2,506,514

REDUCTION DRIVE FOR DRILL PRESSES AND THE LIKE

Robert E. McKelvey, Los Angeles, Calif.

Application March 8, 1946, Serial No. 652,879

7 Claims. (Cl. 74—217)

This invention relates to a reduction drive for drill presses, lathes and other power driven machine tools.

In the conventional drill press as a typical example of many machine tools an electric motor is mounted on the column of the drill press on which a stepped or cone pulley is mounted and which drives through a belt a complementary stepped or cone pulley on the quill of the drill press. The stepped pulleys permit of a speed change for varying the speed at which the quill is driven but as the stepped pulley is mounted directly on the rotor shaft of the electric motor the speed at which it is driven is governed by the speed of the motor. Most motors supplied for machine tools of this character are designed for use with alternating current and consequently their rotors rotate at relatively high speeds. This necessitates the quill of a drill press to likewise be driven at high speed even though the belt drive between the stepped pulleys is so arranged to drive the quill at the lowest speed. The high speed of rotation of the quill of the conventional drill press frequently is not objectionable in drilling with small drills. However, if it is desired to drill with large drills or to use the drill press for routing or end-milling purposes the minimum speed at which the quill can be driven is entirely too high for satisfactory operation.

An object of the present invention is to provide a conversion unit that may be readily applied to the electric motor of a drill press, lathe, or similar machine tool which will enable the stepped pulley associated with the motor to be driven at a materially lower speed than the rotor speed of the motor and thus allow the quill of the drill press to be driven at desired lower speeds.

More specifically an object of the invention is to provide a reduction drive for drill presses, lathes, and like machine tools consisting of a bracket applicable to the motor housing and having a countershaft rotatably and adjustably mounted thereon, the countershaft being equipped with sprockets at its ends which in turn are chain-driven by a sprocket mounted on the rotor shaft and chain drive a driven sprocket rotatably mounted on a bushing surrounding the other end of the motor shaft and having the stepped pulley associated with the motor rigidly connected to the driven sprocket whereby the reduction drive when applied will occupy a minimum amount of space and will not require alteration of the conventional machine tool.

With the foregoing and other objects in view, which will be made manifest in the following detailed description and specifically pointed out in the appended claims, reference is had to the accompanying drawings for an illustrative embodiment of the invention, wherein:

Figure 1 is a perspective view of a drill press illustrating the improved reduction drive as having been applied thereto;

Fig. 2 is a sectional view taken substantially upon the line 2—2 upon Fig. 1; and Fig. 3 is a partial horizontal section taken substantially upon the line 3—3 upon Fig. 2.

Referring to the accompanying drawings wherein similar reference characters designate similar parts throughout, the drill press generally indicated at 10 is of conventional design having an electric motor 11 mounted on its column. The quill of the drill press is generally indicated at 12 and carries a stepped pulley 13 at its top. The stepped pulley 13 is driven by an endless belt 14 and in the conventional drill press the belt 14 is driven by a stepped pulley mounted on the top of the rotor shaft of motor 11. The conversion unit for providing a reduction drive consists of a C-shaped bracket 15, the horizontal arms of which indicated at 16 and 17 are apertured to pass over the ends 18 and 19 of the rotor shaft of the motor. These arms are attached to the motor housing such as by screws 20. The vertical portion 21 of the C-shaped bracket is arranged to lie against the outer side of the motor housing.

To this vertical portion there is hingedly connected such as by a hinge 22 a leaf 23 and this leaf can be adjusted with relation to the bracket by means of an adjusting screw 24 preferably equipped with a jam nut 25. The leaf 23 has bearings 26 and 27 rigidly mounted thereon in mutual alignment and a countershaft 28 is rotatable in these bearings. Collars 29 are mounted on the countershaft and bear against the bearings and serve to hold the countershaft against longitudinal movement therein. The lower end of the countershaft has a sprocket 30 rigidly fastened thereto. This sprocket is driven by an endless chain 31 from a small sprocket 32 which is applied to the lower end 19 of the shaft of the rotor which in the conventional construction projects downwardly a short distance below the motor housing. In a similar manner the upper end of the countershaft 28 is equipped with a small sprocket 33 over which an endless chain 34 is trained. A hollow bushing 35 is provided having a flange 36 at its bottom which is attached to the upper horizontal arm 16 of the bracket. This bushing is slipped over the upper end 18 of the rotor shaft and provides a stationary shaft or spindle on which a large sprocket 37 is rotatable and over which the endless chain 34 is trained. The stepped pulley 38 which is complementary to the stepped pulley 13 is preferably formed integral with the sprocket 37 but may be separate and rigidly attached thereto. The endless belt 14 is trained over this pulley.

By the improved construction it will be appreciated that when the motor 11 is operated its rotor drives the small sprocket 32, the endless chain 31, and the large sprocket 30 so that the countershaft 28 is driven at a materially reduced speed with respect to the speed of rotation of the rotor of the motor. The countershaft in turn drives the sprockets 33 and 37 so that the sprocket 37 and consequently the stepped pulley 38 are driven at a materially reduced speed with respect to the speed of rotation of the shaft 18 of the rotor. Consequently the quill 12 will be driven at a desired reduced speed. The location of the stepped pulley 38 is very close to the initial position of the stepped pulley that is mounted directly on the upper end 18 of the rotor shaft in the conventional construction and does not require a change in position of the stepped pulley 13 and enables the same cover that is conventionally supplied to cover over the top of the drill press to be reapplied. Slack in the chains 31 and 34 can be taken up by the adjustment of the leaf 23 with respect to the bracket, such adjustment being accomplished by the adjusted screw 24.

From the above-described construction it will be appreciated that it is possible to readily convert drill presses and similar motor driven machine tools to enable the spindles or quills thereof to be driven at considerably reduced speeds. In applying the unit it is not necessary to remove the motor from the tool but instead to merely apply the bracket, the sprocket 32, the bushing 35, and the combined sprocket and stepped pulleys 37 and 38. As these supply parts in effect are applied directly to the exterior of the motor they do not involve any material increase in space for the machine and do not require alteration or adjustment of the quill 12 or the stepped pulley 13 or the cover which may be reapplied to the machine. While the invention has been particularly described with relation to drill presses it will be appreciated that it may be applied to all other types of machine tools such as lathes and the like wherein it is similarly desirable to reduce the speed of operation of the driving element of the machine tool.

While sprocket and chain drives are preferably employed at the ends of the countershaft it will be understood that other types of drives may be substituted therefor such as, for example, pulley and belt drives or direct pinion and gear drives, it being merely necessary to provide drives between the rotor shaft and the countershaft which will be about the desirable reduced speed of the stepped pulley.

Various changes may be made in the details of construction without departing from the spirit and scope of the invention as defined by the appended claims.

I claim:

1. A reduction drive for drill presses, lathes and the like, comprising a motor, a bracket applied to the motor housing, a countershaft rotatably mounted on the bracket, sprockets on the ends of the countershaft disposed opposite ends of the rotor shaft of the motor, a sprocket on one end of the rotor shaft, a chain connecting the sprocket with the sprocket on the adjacent end of the countershaft, a bushing disposed about the other end of the rotor shaft, a sprocket and pulley rotatable upon the bushing, and a chain connecting the last mentioned sprocket with the sprocket on the other end of the countershaft.

2. A reduction drive for drill presses, lathes, and the like, comprising a motor, a sprocket secured to one end of the rotor shaft of the motor, a countershaft mounted on the side of the motor for rotation about an axis parallel to the rotor shaft, a sprocket on the countershaft chain driven from the mentioned sprocket, a sprocket and pulley mounted for rotation about the other end of the rotor shaft, and chain and sprocket means for driving the sprocket and pulley from the adjacent end of the countershaft.

3. A reduction drive for drill presses, lathes, and the like, comprising a motor, a sprocket secured to one end of the rotor shaft of the motor, a countershaft mounted on the side of the motor for rotation about an axis parallel to the rotor shaft, a sprocket on the countershaft chain driven from the mentioned sprocket, a sprocket and pulley mounted for rotation about the other end of the rotor shaft, and chain and sprocket means for driving the sprocket and pulley from the adjacent end of the countershaft, and means for adjusting the countershaft toward and away from the rotor shaft.

4. A reduction drive for drill presses, lathes, and the like, comprising a motor, a C-shaped bracket applied to the motor having its arms disposed over the ends of the rotor shaft, a leaf hingedly mounted upon the bracket, a countershaft rotatably mounted upon the leaf for rotation about an axis parallel to the rotor shaft, means for adjusting the leaf with relation to the bracket to adjust the countershaft toward and away from the rotor shaft, means providing a drive between one end of the rotor shaft and one end of the countershaft, a pulley mounted for rotation about the other end of the rotor shaft, and means providing a drive between the other end of the countershaft and said pulley.

5. A reduction drive for drill presses, lathes, and the like, comprising a motor, a countershaft mounted for rotation on the motor for rotation about an axis parallel to the rotor shaft of the motor, means providing a drive between one end of the rotor shaft and one end of the countershaft, a pulley mounted for rotation about the other end of the rotor shaft, and means providing a drive between the other end of the countershaft and said pulley.

6. A reduction drive for drill presses, lathes, and the like, comprising a motor, a countershaft mounted for rotation on the motor for rotation about an axis parallel to the rotor shaft of the motor, means providing a drive between one end of the rotor shaft and one end of the countershaft, a bushing mounted upon the motor about the other end of the rotor shaft, a pulley mounted for rotation upon said bushing, and means providing a drive between the other end of the countershaft and said pulley.

7. A reduction drive assembly adapted to be applied to the motor of a drill press, lathes and the like comprising bracket means adapted to be applied to the motor, a countershaft extending the length of the motor and rotatably mounted on the bracket means with its axis parallel to the rotor shaft of the motor, means at least a part of which is mounted on one end of the countershaft adapted to provide a drive between said one end of the countershaft and one end of the rotor shaft of the motor, a pulley supported by the bracket means so as to be rotatable about the other end of the rotor shaft, and means providing a drive between the other end of the countershaft and said pulley.

ROBERT E. McKELVEY.

REFERENCES CITED

The following references are of record in the file of this patent:

UNITED STATES PATENTS

| Number | Name | Date |
|---|---|---|
| 1,693,757 | Kaptuller | Dec. 4, 1928 |
| 2,176,572 | Hedgpeth | Oct. 17, 1939 |
| 2,299,921 | Myers | Oct. 27, 1942 |
| 2,430,798 | Alexander | Nov. 11, 1947 |